US012536980B2

(12) United States Patent
Barr

(10) Patent No.: US 12,536,980 B2
(45) Date of Patent: Jan. 27, 2026

(54) MODIFIED BRIDGE SADDLE FOR GUITARS

(71) Applicant: Steven Barry Barr, Delray Beach, FL (US)

(72) Inventor: Steven Barry Barr, Delray Beach, FL (US)

(*) Notice: Subject to any disclaimer, the term of this patent is extended or adjusted under 35 U.S.C. 154(b) by 306 days.

(21) Appl. No.: 18/323,899

(22) Filed: May 25, 2023

(65) Prior Publication Data

US 2024/0395228 A1 Nov. 28, 2024

(51) Int. Cl.
*G10D 3/04* (2020.01)

(52) U.S. Cl.
CPC .................................... *G10D 3/04* (2013.01)

(58) Field of Classification Search
CPC .................................. G10D 3/04; G10D 3/00
See application file for complete search history.

(56) References Cited

U.S. PATENT DOCUMENTS

2018/0033409 A1* 2/2018 Colas ...................... G10D 3/12

* cited by examiner

*Primary Examiner* — Kimberly R Lockett

(57) ABSTRACT

A guitar bridge saddle used as part of a Tune-o-Matic™ bridge or similar bridge, that is made substantially of hardwood such as ebony or rosewood. The saddle incorporates an embedded metal rod so that it can withstand the downward pressure of the string, and also incorporates an embedded threaded insert bonded to the wood which provides additional strength and allows the adjustment screw to turn freely. A guitarist would have the benefit of the quality of sound provided by a wood bridge with the added benefit of being able to adjust the length of each string individually.

2 Claims, 2 Drawing Sheets

MODIFIED BRIDGE SADDLE FOR GUITARS

References Cited 2,740,313 July 1952 McCarty . . . 84/307
3,538,233 November 1970 Compton . . . 84/1.16
4,430,919 February 1984 Matsui . . . 84/299
4,768,414 September 1988 Wheelwright . . . 84/298
5,481,956 January 1996 LoJacono . . . 84/314 N
10/930,828 March 2006 Chang . . . 84/298
9,799,307 October 2017 Minasi . . . G10D 1/085
13/530,320 June 2013 Gimpel G10D . . . 3/04
17/342,0036 January 2022 Haynes G10D . . . 3/04

FIELD OF THE INVENTION

This invention relates to the bridges used on guitars, consisting of a mechanism to adjust the length of each individual string to achieve more perfect tuning.

BACKGROUND OF THE INVENTION

This invention relates to the saddles used on adjustable bridges for guitars currently known as Tune-o-Matic™, based on the McCarty U.S. Pat. No. 2,740,313 Bridge For Stringed Musical Instruments. The Tune-o-Matic™ bridge allows the length of each guitar string to be adjusted in order to maintain accurate intonation. Most of the Tune-o-Matic™ bridges come preinstalled with metallic individual bridge saddles, finished in chrome, gold or made of other material such as nylon. There are also aftermarket bridge saddles designed to fit the Tune-o-Matic™ type bridge made of a variety of materials.

The material of the bridge saddle will affect the sound. Some guitarists prefer a non-Tune-o-Matic™ bridge made of wood such as ebony or rosewood. These are made in a variety of carved shapes that are fitted to the top of the guitar. However, the adjustment of the string length is made by moving the entire bridge.

BACKGROUND ART

Prior art has made several design, manufacturing, and sound quality improvements to the concept of a guitar bridge with adjustable saddles. However, none of these have addressed the invention of a wood saddle to be used on the Tune-o-Matic™ and similar bridges.

In Compton U.S. Pat. No. 3,538,233 Electric Bass Guitar And Elastomeric Bridge Therefor, the adjustable bridge makes use of material placed between the string and saddle for the purpose of affecting the sound, namely to mute the sound. The claims specify various types of material and thickness and is an example of enhancing or modifying the prior art.

Mitsui U.S. Pat. No. 4,430,919 Guitar Bridge makes use of an adjustable saddle accomplished by sliding, with a holding screw that firmly fixes the saddle to the main body. The advantage claiming to be that the string vibration would be more surely transferred to the main body of the bridge. In this configuration a wood saddle could be used that would support the downward pressure of the string.

Wheelwright U.S. Pat. No. 4,768,414 Adjustable Saddle For Individual Instrument String makes use of an adjustable saddle that is secured firmly to a bridge platform. In this configuration a wood saddle could be used that would support the downward pressure of the string.

LoJacono U.S. Pat. No. 5,481,956 Apparatus And Method Of Tuning Guitars And The Like provides for the adjustment of both bridge saddle members and nut saddle members, claiming the advantage of more accurate string intonation adjustment. The patent references the use of preferred materials for the nut and bridge saddles as brass, plastic, nylon and carbon. In this configuration, the bridge and nut saddles are supported substantially on the bottom and do not have an issue of sustaining the string downward pressure across a span.

Chang patent application Ser. No. 10/930,828 Guitar Saddle Structure is a modification of the configuration in the Tune-o-Matic™, where the saddle side surfaces, termed bucking surface, and the surface where the saddle contacts the bridge, termed the ramp, are angled. The claim is that this would provide a tighter connection between the saddle and the bridge and therefore a clearer sound. Also claimed is that this configuration eliminates some of the discrepancies caused by manufacturing. It is possible that a wood saddle could function in this configuration.

Minasi U.S. Pat. No. 9,799,307 Saddlerail Bridge proposes a bridge saddle that would withstand string tension by its configuration. The design claims to enable manufacture in a combination of less rigid materials such as wood, bone and other man made. The disclosure states that the Tune-o-Matic™ saddles would not support string tension if made of wood.

Gimpel patent application Ser. No. 13/530,320 Adjustable Bridge For Stringed Musical Instrument has the advantage of avoiding the use of springs, set screws, detents, removable screws and fasteners. The bridge saddle is retained within the slot by friction. In this configuration a wood saddle would sustain the string tension.

Haynes patent application Ser. No. 17/342,0036 Stringed Instrument Bridge makes use of a bridge saddle retained in place by two (2) screws. Since the saddle mounts flat against the bridge surface, a wood saddle could be used.

SUMMARY OF THE INVENTION

The Modified Bridge Saddle For Guitars is made of hardwood and is designed to fit and replace the original metallic or nylon saddles of the Tune-o-Matic™. While a carving of the saddle to the exact shape of the original parts can be made, as such, it would not support the downward pressure and stress applied by the strings. The hardwoods such as ebony and rosewood are brittle and would tend to fracture under the pressure of the strings.

The Modified Wood Bridge Saddle incorporates a thin metal rod made of brass or other metal inserted across the upper portion of the saddle perpendicular to the string. The string length adjustment is accomplished the same way as per the Tune-o-Matic™ with the addition of a threaded brass or metal insert. The addition of the metal insert avoids the wear and tear that would occur if the thread were made directly into the wood, and more importantly adds additional support when bonded to the saddle so as to withstand the string pressure.

The overall benefit is then to suit the taste of the guitarist to have the benefit of the sound made by a wood bridge, with the ability to adjust the vibrating length of each string individually. The convenience of this invention is that it is designed to replace the existing saddles of the Tune-o-Matic™ Bridge and the like, which is the most widely used and available bridge in the marketplace.

DETAILED DESCRIPTION OF THE INVENTION

Figure 1:
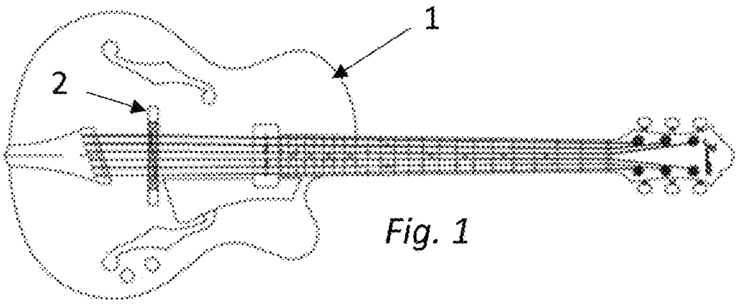
FIG. 1 is a picture of a typical archtop guitar used by jazz guitar players, with a Tune-o-Matic™ bridge fitted to the top via a hardwood base.
Figure 2:
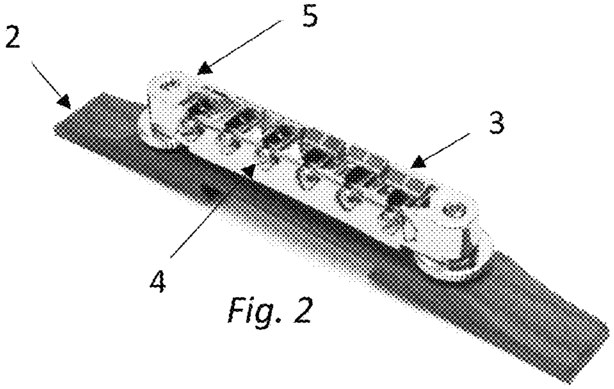
FIG. 2 Is a picture of a Tune-o-Matic™ bridge mounted on a hardwood base, showing the replaceable individual saddles and the adjustment screws.
Figure 3:
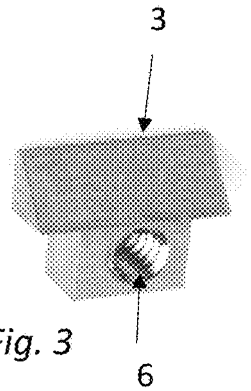
FIG. 3 Is a picture of a replaceable metallic bridge saddle with the threaded adjustment hole.
Figure 4:
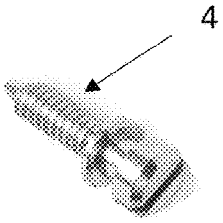
FIG. 4 is a picture of the removeable threaded adjustment screw which is designed to match the threaded hole, and to securely fit into the Tune-o-Matic™ bridge.
Figure 5:
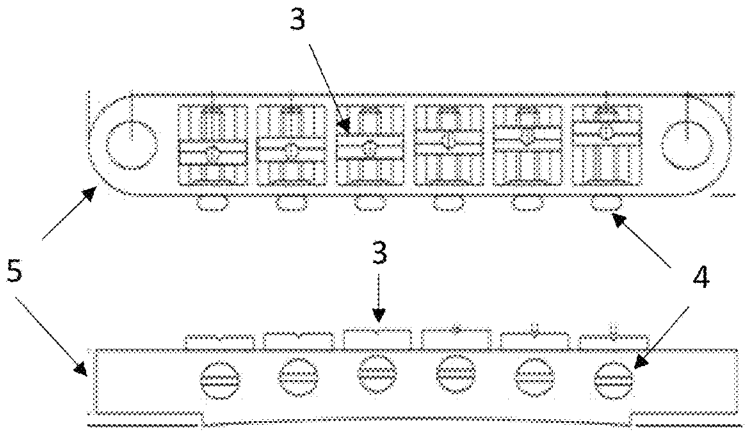
FIG. 5 is a top view and side view diagram of a Tune-o-Matic™ bridge.
Figure 6:
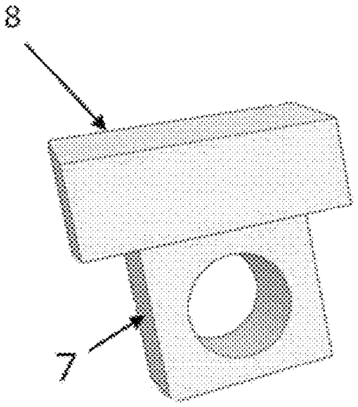
FIG. 6 is a depiction of the proposed carved hardwood saddle in the shape and size of the replaceable Tune-o-Matic™ bridge saddle.
Figure 7:
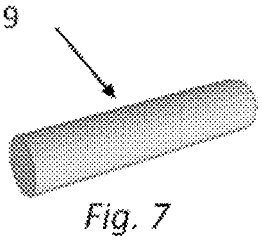
FIG. 7 is a depiction of the metal support rod which is to be inserted into the upper portion of the hardwood saddle.

This invention is a replacement saddle made of hardwood for Tune-o-Matic™ bridges 5 that allows for the adjustment of the length of individual strings on a guitar. The Tune-o-Matic™ bridge can be installed on the top of a guitar in many ways such as depicted in FIG. 2 as mounted onto a hardwood support 2 fitted to the top of a guitar having an arched top. Other methods involve the use of fixed posts screwed into the top of a solid body guitar. In any case, this invention is an improvement to the replacement part called the saddle 3 as pictured in FIGS. 2, 3 and 5. The quality and flavor of the sound made by the guitar is largely affected by the contact point of the strings to the body of the instrument.

Hardwood such as ebony or rosewood have for a long time been a chosen material for a guitar bridge to support the strings directly on the body of a guitar 1. While the sound of wood is preferred by many, the achievement of perfect intonation is a compromise. The benefit of the Tune-o-Matic™ is to achieve better or more accurate intonation, however, the choice of material for the saddle was limited to the ability to withstand the downward pressure of the strings. Prior designs and inventions have taken advantage of a variety of materials for a saddle, and are fitted to various bridge configurations, but none of these designs have used hardwood to fit the original Tune-o-Matic™ shape.

This invention addresses the problem of using hardwood such as ebony or rosewood for a Tune-o-Matic™ saddle. Ebony has some preferred tonal qualities, but is also brittle. It stands up well when used as a large piece for the entire bridge, but does not hold up well when carved to the very small dimensions of a saddle of approximately 9 mm by 9 mm, designed to fit the Tune-o-Matic™ 5. The same holds true for rosewood, but to a lesser extent. This invention enhances the strength of a saddle carved out of ebony or rosewood in two (2) ways: by inserting a metal rod 9 thru the upper portion of the saddle 8 perpendicular to where the string 12 rests as indicated in FIG. 9, and by inserting a threaded metal insert 10 thru the lower portion of the body

7 where the threaded adjustment hole should be. The threaded metal insert 10 is cut with the thread 11 sized to correspond to the thread size of the screw 4 which is provided with the Tune-o-Matic™ 5 and similar bridges. This thread size is typically M 3×.05, but other sizes can be accommodated. The threaded metal insert 10 serves two (2) functions: it makes for smoother adjustments that will stand up to wear, but more importantly adds to the strength of the saddle when bonded properly to the lower portion of the body 7. The threaded metal insert should be bonded to the surface of the wood for added strength and to fix it into position to give the adjustment screw 4 the ability to move the saddle without loosening the insert. Bonding can be accomplished by incorporating a glue hole or slot into the saddle either though the side 19 of the saddle, or bottom 20 of the saddle, or both. Bonding can also be accomplished by cutting the hole 17 in the saddle to a slightly larger diameter than the metal insert 10 which will allow additional room for a bonding substance such as epoxy.

Figure 9:
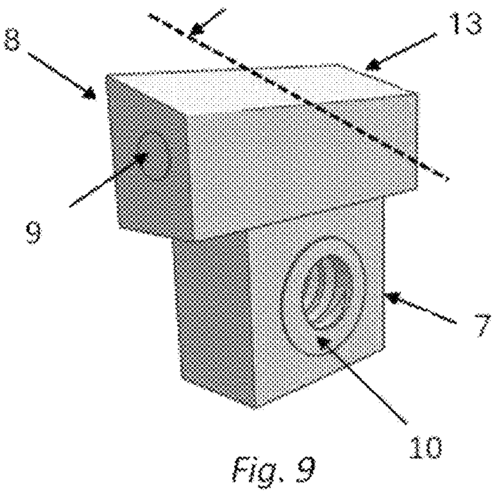
FIG. 9 is a depiction of the hardwood saddle showing the inserted support rod and threaded metal insert.
Figure 8:
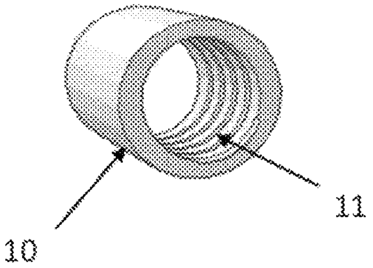
FIG. 8 is a depiction of the threaded metal insert.
Figure 10:
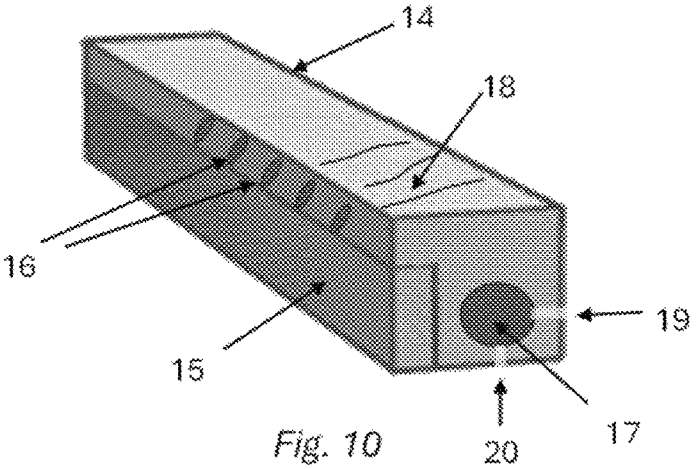
FIG. 10 is a depiction of the hardwood block before the shape of the saddle is carved, showing the drill and carving locations.

The exact position of the string 12 where it contacts the top portion of the saddle 8 as indicated in FIG. 9 is left to the installer or luthier. Typically a notch is carved at that said point, and the location needs to take into consideration the desired distance between the strings, which will vary based on the guitar. For this reason, the manufacture of these saddles will leave the top portion blank or unfinished.

The difficulties in manufacturing the saddle made of hardwood such as ebony and rosewood have been addressed. Starting with an elongated square block of hardwood 14 where the grain 18 is across the shorter dimension, several smaller incremental cuts are made using router or dado technology at the indicated location 15. This is to eliminate the tendency of the chosen hardwood to chip or fracture. It has been found to be preferable to insert the supporting metal rod across multiple attached saddles at locations 16, and also to insert a long threaded rod thru the elongated square block at location 17. This technique provides added strength before carving the shape. Other methods to manufacture the saddle include the use of CNC machinery which can configure the cuts in a variety of steps. Laser cutting technology can also be used to accurately cut each saddle individually in either one or two parts.

It is anticipated that there will be variations in size of the saddle, as well as variations in the placement of the threaded insert. This is to accommodate the variety of Tune-o-Matic™ bridge versions and manufacturers in the marketplace.

The overall benefit and advantage of this invention is that it will be an easily obtainable aftermarket addition for those guitar players who favor the sound and effect of a more adjustable wood bridge.

The invention claimed is:

1. A guitar bridge saddle for an adjustable saddle type bridge, said saddle comprising:

a hardwood block comprising a substantially elongate upper portion, configured to support a guitar string, and a substantially rectangular lower portion, disposed immediately below said upper portion;

said upper portion extending lengthwise of a set width when in use in a direction perpendicular to the guitar string to be supported thereon; and said lower portion being substantially the same width as, and of lesser length than, the upper portion;

said saddle further comprising (1) an elongate metal support rod disposed within, and extending lengthwise in said upper portion; and (2) a metal tube disposed within said lower portion and extending perpendicular to said direction of said upper portion, said metal tube having internal threads adapted to receive an adjustment screw.

2. The guitar bridge saddle of claim 1, wherein the upper portion is integral with the lower portion of the hardwood block.

* * * * *